United States Patent [19]

Houlihan

[11] Patent Number: 4,780,864
[45] Date of Patent: Oct. 25, 1988

[54] COMBINATION WRISTWATCH AND BICYCLE COMPUTER

[75] Inventor: John T. Houlihan, Watertown, Conn.

[73] Assignee: Timex Corporation, Middlebury, Conn.

[21] Appl. No.: 171,056

[22] Filed: Mar. 21, 1988

[51] Int. Cl.$^4$ .............. G04B 47/00; G01D 3/42; B62J 3/00

[52] U.S. Cl. .................. 368/10; 324/160; 340/134; 377/20

[58] Field of Search .......... 368/10, 107–110; 324/160, 161, 166, 134, 670; 364/561, 565, 569

[56] References Cited

U.S. PATENT DOCUMENTS

| | | | |
|---|---|---|---|
| 3,865,305 | 2/1975 | Samply | 377/24 |
| 3,898,563 | 8/1975 | Erisman | 324/166 |
| 4,007,419 | 2/1977 | Jasmine | 324/166 |
| 4,022,014 | 5/1977 | Lowdenslager | 368/10 |
| 4,071,892 | 1/1978 | Genzling | 364/424 |
| 4,156,190 | 5/1979 | Chittenden | 324/175 |
| 4,334,190 | 6/1982 | Sochaczeuski | 324/171 |
| 4,352,063 | 9/1982 | Jones et al. | 324/171 |
| 4,633,216 | 12/1986 | Tsuyama | 340/134 |
| 4,636,769 | 7/1987 | Tsuyama | 340/134 |
| 4,642,606 | 2/1987 | Tsuyama | 340/134 |

*Primary Examiner*—Vit W. Miska
*Attorney, Agent, or Firm*—William C. Crutcher

[57] ABSTRACT

A digital wristwatch having a case and strap also serves as a computer to display speed, distance, and pedaling cadence when temporarily attached to a holder on the bicycle handlebar. Wheel and sprocket sensors are connected to electrical terminals in the holder. The wristwatch is provided with external electrical terminals connected to a microcomputer in the watchcase which uses signals from the sensors when the watchcase is termporarily retained in the holder. The watch mode is converted to bicycle mode by actuating push buttons on the watchcase, which are accessible through windows on the holder.

10 Claims, 6 Drawing Sheets

COMBINATION WRISTWATCH AND BICYCLE COMPUTER

BACKGROUND OF THE INVENTION

This invention relates generally to improvements in a digital wristwatch which also functions as a computer to monitor operation of a bicycle, such as speed, distance traveled, and cadence (pedaling speed of the cyclist). More particularly, the invention relates to an improved accessory for a bicycle which temporarily converts a digital wristwatch into a bicycle computer.

Bicycle speedometers, odometers, and cadence counters are well-known which utilize sensors mounted with respect to the moving elements of the bicycle. Patents exemplary of such devices are seen in U.S. Pat. Nos. 4,156,190 - Chittenden, 4,352,063 - Jones, et al., 4,007,419 - Jasmine, and 3,898,563 - Erisman. Bicycle computers have been provided with microprocessor integrated circuits, with means for externally programming, setting, or changing the computations performed by the bicycle computer with push buttons or keyboards. Exemplary of such devices are U.S. Pat. Nos. 4,334,190 - Sochaczevski, and 4,633,216, 4,636,769, and 4,642,606—all in the name of Tsuyama.

A number of patents have illustrated digital speed or distance measuring systems which may be calibrated or adjusted to allow for variations in wheel size, among these being the aforesaid Sochaczevski U.S. Pat. Nos. 4,334,190, and 3,865,305 - Sampey, and 3,614,617 - Blake.

All of the aforesaid patents describe devices which are intended to be permanently attached to the bicycle or other vehicle. While some of the aforesaid devices provide visual or aural indication of cadence, they do not provide the functions furnished by a modern digital wristwatch, such as time of day, day, date, elapsed time, chronograph, and so forth.

A digital wristwatch has been proposed which receives external signals, makes internal computations and displays the result of the computations on the normal timekeeping display in U.S. Pat. No. 4,022,014 issued May 10, 1977 to Lowdenslager and assigned to the applicant's assignee. This wristwatch has no provision for temporarily holding the watch when it is receiving external signals.

Accordingly, one object of the present invention is to provide an improved combination wristwatch and bicycle computer.

Another object of the invention is to provide an improved accessory holder for temporarily holding the wristwatch and introducing external signals to be displayed.

DRAWINGS

The invention, both as to organization and method of practice, together with other objects and advantages thereof, will best be understood by reference to the following description, taken in connection with the accompanying drawings, in which:

FIG. 2 is a top plan view.

SUMMARY OF THE INVENTION

Briefly stated, the invention is practiced by providing a combination timepiece and bicycle computer for monitoring the operation of a bicycle comprising: a case with an electrooptical display and a timekeeping circuit: the circuit being also responsive to external signals; first electrical terminals arranged externally on the case and connected to the circuit; a holder arranged for attachment to the bicycle and having a receptacle adapted to temporarily hold the case, the holder having second electrical terminals adapted to contact said first electrical terminals when the case is in the receptacle; and at least one sensor disposed on the bicycle for providing a first periodic signal and connected to selected second terminals.

DESCRIPTION OF THE PREFERRED EMBODIMENT

Figure 1:
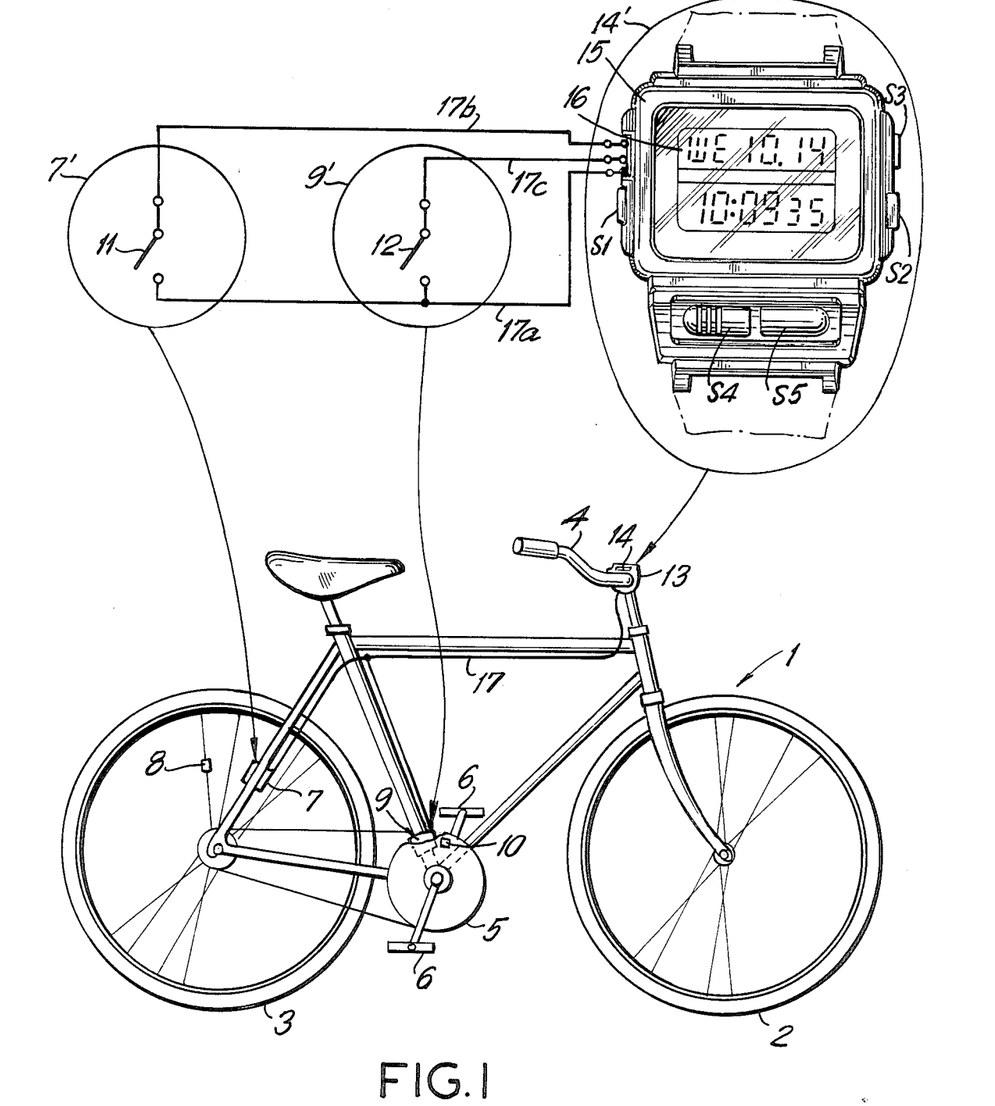
FIG. 1 is a simplified schematic view of a bicycle indicating location of sensors and the combination wristwatch and bicycle computer.

Referring now to FIG. 1 of the drawing, a bicycle 1 has the usual front and rear wheels 2, 3, handlebar 4 for steering, and drive sprocket 5 operated by pedal 6. A first sensor 7 is mounted on a stationary part of the frame and is actuated during each revolution of rear wheel 3 by a permanent magnet 8 mounted on the wheel. A second sensor 9 is actuated during each revolution of pedal sprocket 5 by a permanent magnet 10 mounted on the sprocket. Sensors 7, 9 simply provide switch closures and may be magnetically responsive reed switches. As shown in the expanded schematic 7', sensor 7 operates to close a switch 11 each time the magnet 8 passes sensor 7. Similarly, as seen in the expanded schematic 9', sensor 9 closes a switch 12 each time magnet 10 passes sensor 9.

Mounted on handlebar 4 is a holder 13 for temporarily holding a digital wristwatch 14. In the expanded schematic 14', digital wristwatch 14 is seen to comprise a case 15, an electrooptic display 16, manually actuated push buttons S1, S2, S3 mounted in the side of case 15, and push buttons S4, S5 mounted in the top of case 15.

Lastly, an insulated electrical cable 17 carries electrical signals from the sensors 7, 9 to the wristwatch 14 by way of a common conductor 17a and switching conductors 17b, 17c. These are connected to a circuit (not shown) inside the wristwatch case 15 in a manner to be described.

Figure 2:
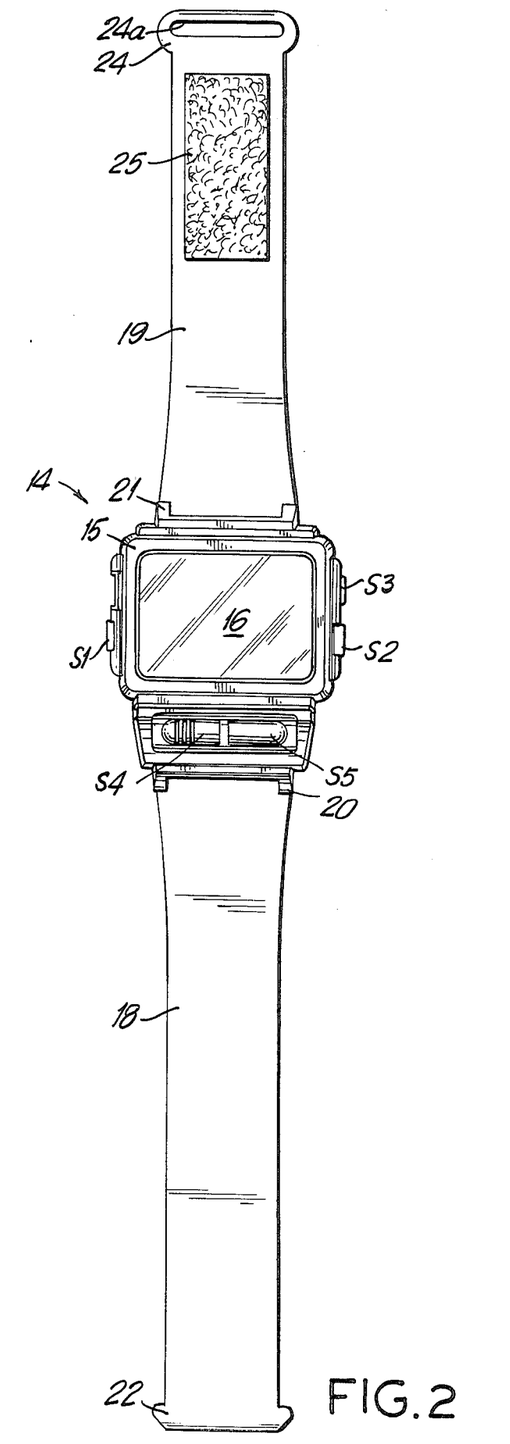
Figure 3:
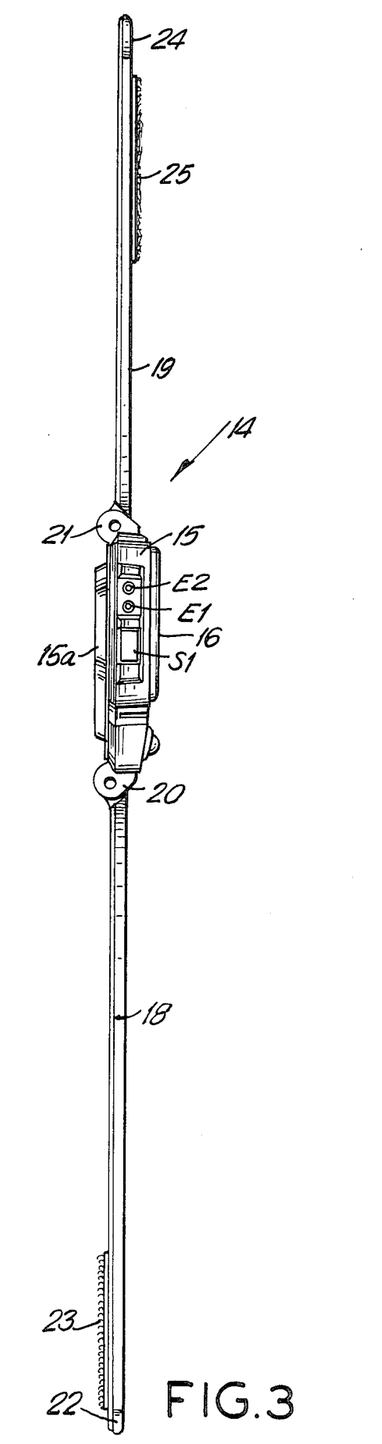
FIG. 3 is a left side elevation view of a digital wristwatch used in the present invention.

Referring now to FIGS. 2 and 3 of the drawing, a preferred embodiment of the wristwatch is shown when removed from the holder. It is adapted to be worn as an ordinary wristwatch by means of strap halves 18, 19 attached by spring bars to the lugs 20, 21 of case 15. Strap half 18 terminates in a widened tongue portion 22 and includes a strip of VELCRO (Registered Trademark of Velcro Corporation) on its under side indicated at 23. The strap half 19 terminates in an expanded rigid loop 24 with an opening 24a, and includes a mating strip of VELCRO 25 on its upper side. The type of strap attachment is immaterial to the present invention and any conventional watch strap or band could also be used.

A set of first electrical terminals are arranged externally on case 15. These comprise socket terminals E1 and E2 on the side of case 15 and a metallic caseback 15a for the ground or common connection. Alternatively an additional socket terminal could be substituted for caseback 15a. The first electrical terminals are connected to the circuit inside the case 15.

Figure 4:
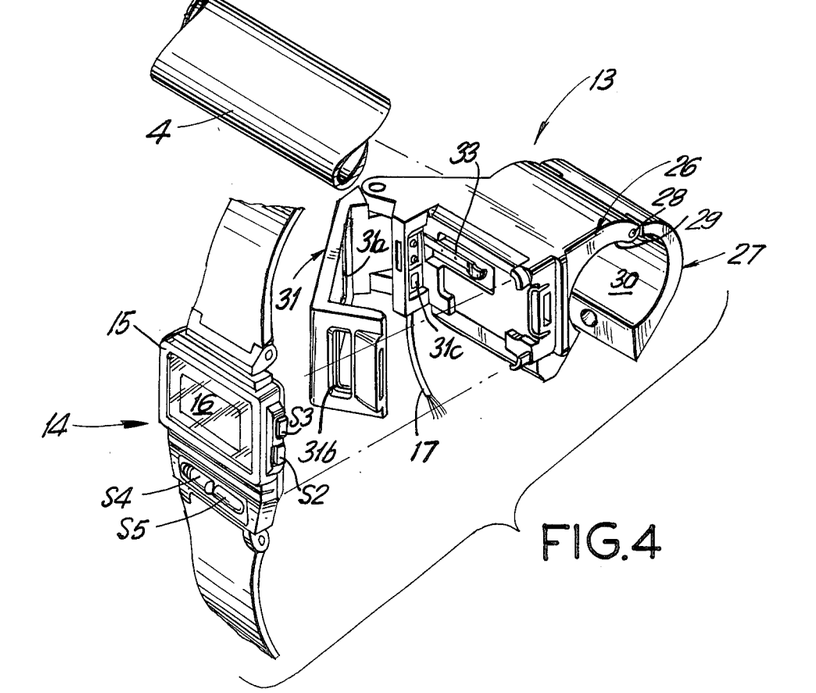
FIG. 4 is an exploded perspective view of wristwatch, holder, and portion of a bicycle handlebar.

Referring now to FIG. 4 of the drawing, the holder 13 is seen in perspective view alongside a portion of bicycle handlebar 4 and watch 14. Holder 13 includes a first housing part 26 and a second housing part 27 pivotably connected thereto by means of a pin 28. Members 26, 27 together define inner semi-cylindrical surfaces 29, 30 which are dimensioned to grip and attach holder 13 to handlebar 4 when members 26, 27 are pivoted and secured together.

Housing 13 includes a second pivotable member 31, which, together with the upper surface of housing member 26 define a receptacle for temporarily holding watch 14 when it is inserted and when member 31 pivoted to a closed position. Member 31 defines a top window 31a arranged for viewing the electrooptical display 16 when the watch is inserted, a side window 31b for obtaining access to push button actuators S2, S3, and a recess 31c for accommodating push button actuator S1. A metal spring clip 33 is connected to the common conductor 17a in cable 17.

Figure 5:
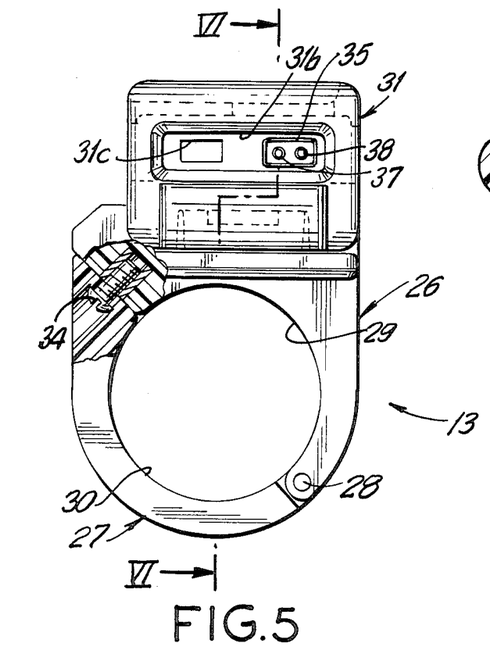
FIG. 5 is an end elevation view, partly in section, of the holder.
Figure 6:
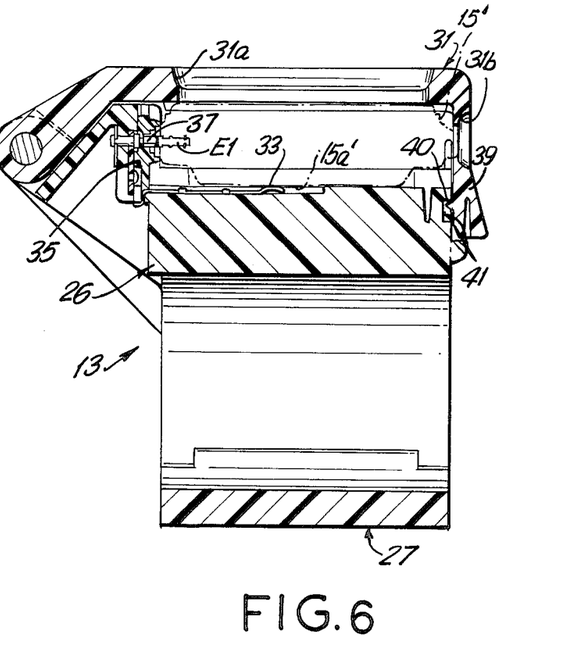
FIG. 6 is a side elevation view in section, taken along lines VI—VI of FIG. 5.

Reference to the enlarged end and side elevation drawings of holder 13 in FIGS. 5 and 6 will illustrate further details of the holder 13.

As shown in FIG. 5, the pivot pin 28 permits the second housing part 27 to pivot to a closed position, where it is secured tightly around the handlebar by means of a screw 34 threaded into the first housing part 26. The pivoted member 31 is also shown in a closed position. As seen through window 31b, a gasket 35 on the opposite wall of the receptacle surrounds a pair of electrical terminal pins 37, 38.

Referring to FIG. 6, holder 13 illustrates that the upper pivotable member 31 includes an extending flap 39 with a protrusion 40 which mates in a groove 41 in the first housing part 26. The location of the watchcase 15 is illustrated by the phantom outline 15'. Gasket 35 provides an insulating socket for the electrical connection pins 37, 38. Pin 37 is properly positioned to make electrical contact with the appropriate external watch terminal E1 when the watch is properly located in the receptacle of holder 13. Similarly pin 38 makes contact with external watch terminal E2. Also, as shown by the phantom outline 15' of the watchcase, its electrically conductive caseback 15a' makes electrical contact with the spring clip 33.

The two pins 37, 38 and the spring clip 33 together comprise second electrical terminals which are disposed in the holder and connected to the cable 17 leading to the sensors 7 and 9. Spring clip 33 is connected to common conductor 17a, and pins 37, 38 are connected to switching conductors 17c and 17b respectively.

Figure 7:
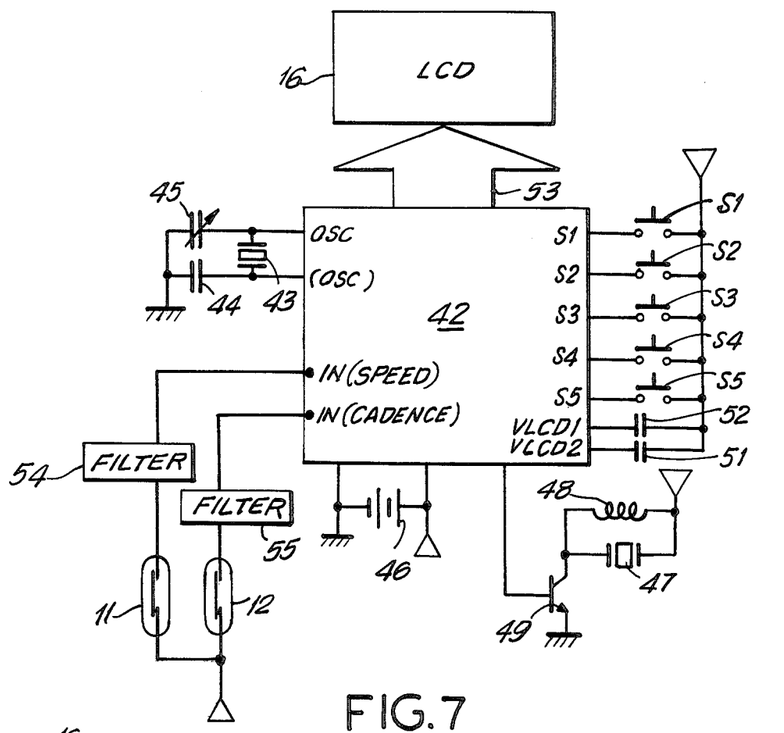
FIG. 7 is a circuit diagram illustrating in schematic form the integrated circuit and discrete electronic components used in the wristwatch.

Referring now to the circuit drawing of FIG. 7, the schematic illustrates an integrated circuit 42, which is a commercially available mask-programmable microcomputer chip, having internal microprocessor, memory, input and output control circuits, LCD display drive circuits and programmed instructions sets. Such microcomputers are readily available from several sources, but a suitable microcomputer for the present application is part number JT 7598 AS, which is available from Toshiba Electric Company. Also shown on the FIG. 7 schematic drawing are the LCD display 16, magnetic reed switches 11, 12, and actuators S1 through S5 discussed previously in connection with FIG. 1. Enclosed in the watchcase 15 with the integrated circuit 42 and the LCD 16 are a number of additional circuit elements which are well-known and normally understood to be part of the operational parts of a digital wristwatch circuit. These are a quartz crystal 43 serving as a time base, external fixed capacitor 44 and variable capacitor 45 which are connected in circuit with quartz crystal 43, and are connected to pins labeled OSC and (OSC).

A battery power source 46 is provided in the form of a button-type energy cell in the watchcase. A watch alarm and/or cadence beeper is made up of a piezo electric crystal 47, inductance coil 48, and drive transistor 49.

Figure 8:
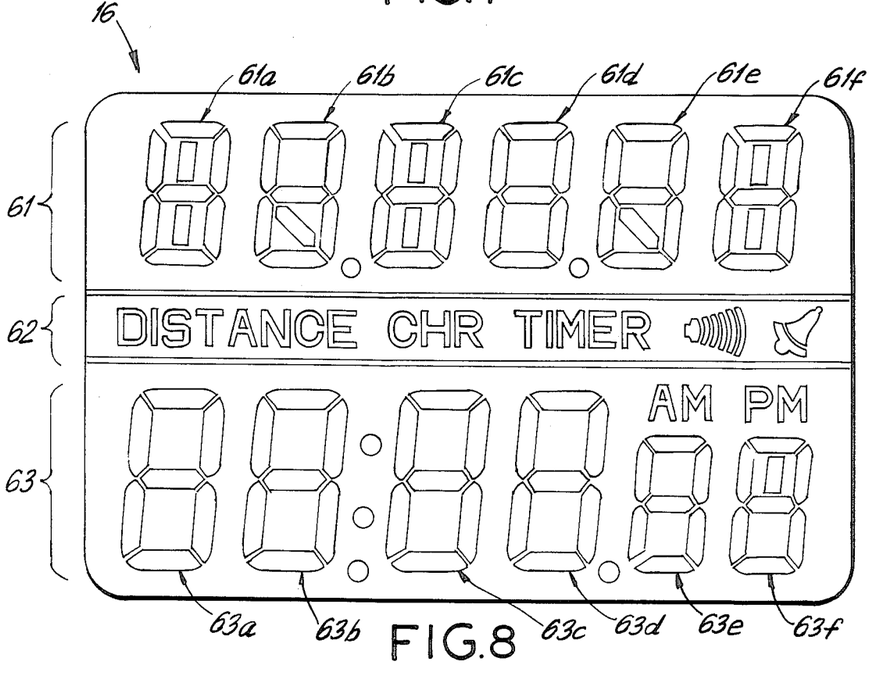
FIG. 8 is a plan view of the electrooptical display illustrating the layout of segments.

Two fixed external capacitors 51, 52, combined with other circuit elements inside the integrated circuit 42 serve to boost the output voltage to drive LCD 16 through a display bus 53, which represents the several parallel leads connected to the various actuatable segments of the LCD display shown in FIG. 8.

Connected between the external switch 11 and an input pin labeled IN (SPEED) on integrated circuit 42 is a filter 54 for removing noise and insuring the desired external input signal at each closure of switch 11. Similarly a filter 55 is provided between external switch 12 and an input pin labeled IN (CADENCE).

The microcomputer integrated circuit 42 is programmed at the time of manufacture to provide the various functions of a digital wristwatch, to receive periodic input signals from outside the watchcase provided by sensor switches 11, 12, to make internal computations of speed, distance, and cadence, to decode and display the results, and to provide logic for changing back and forth between watch mode and bicycle mode of operation by appropriate actuation of switches S1–S5. Conventional programming techniques are used which are within the knowledge of those skilled in the art.

Referring now to FIG. 8 of the drawing, the layout of segments for the liquid crystal display used in the bicycle watch is shown. An upper level 61 of digits 61a–61f has individually actuatable segments arranged to indicate day/date in the manner of a digital calendar watch, as well as to provide certain messages when in other timekeeping states or bicycle speed/odometer states. A central level 62 provides for word messages and symbols. A lower level 63 of digits 63a–63f has actuatable segments providing standard hour/minute/second indication when in timekeeping state of the watch mode and provides speed/distance indication when in bike mode. Both the upper level 61 and lower level 63 further include extra segments giving capability for certain alphanumeric messages in the calibration mode, as will be apparent from the following description of these modes and by comparison with appropriate segments on the display.

Figure 9:
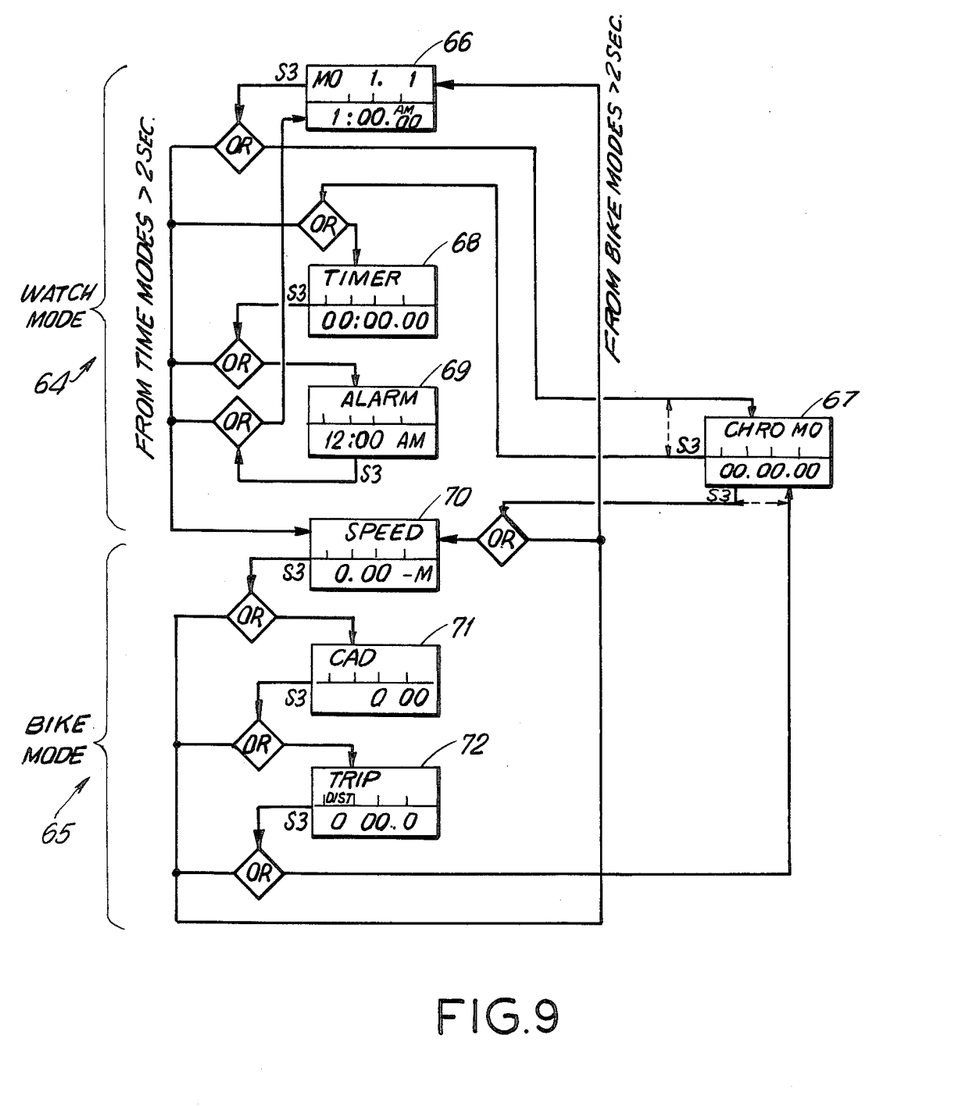
FIG. 9 is a state diagram of the various modes and functions provided by the circuit of FIG. 7.

Referring now to FIG. 9 of the drawing, a "state" diagram is shown in schematic form. Each of the rectangles represents a representative display shown on electrooptical display 16 when the instrument is in that "state." The instrument continues to operate under control of the particular subroutine of the program in the microcomputer chip, until the instrument is placed into another state. Change from one state to another proceeds by actuation of a manual actuator either momentarily or by holding it for a preselected elapsed time determined by the master program. In the diagram illustrated in FIG. 9 the manual actuator switch S3, together with the length of time that switch S3 is held depressed, initiates a change to the next state. Depression of switch actuator S3 introduces a decision represented by the diamond labeled "OR". The length of time that switch S3 is depressed determines the exit path from the "OR". The preselected switch depression time, which can easily be changed by reprogramming, is 2 seconds in the example shown in FIG. 9.

Although the states can be sequenced in any desired manner, depending on how the microcomputer chip instrument is programmed, the FIG. 9 arrangement shows a "watch mode" indicated generally at 64 and a "bike mode" indicated generally at 65. The watch mode comprises 4 separate states or functions, a day/date timekeeping state 66, a chronograph state 67, a timer state 68, and an alarm state 69. The bike mode 65 comprises 4 separate states, shown as a speed state 70, a cadence state 71, a distance or trip state 72, and the aforementioned chronograph state 67, which is common to both watch mode 64 and bike mode 65. Repetitive momentary actuation of actuator S3 while in the watch mode causes the display to cycle repetitively through states 66, 67, 68, 69, 66—. Actuation of switch S3 for more than 2 seconds in any of these states causes the instrument to shift from watch mode 64 to bike mode 65, entering the bike mode in the speed state 70 of bike mode 65.

While in the bike mode, repetitive momentary actuation of switch S3 causes the device to cycle repetitively through states 70, 71, 72, 67, 70—. Depression of switch S3 for more than 2 seconds causes the device to shift from bike mode 65 back to watch mode 64.

The number of modes shown, and the number and sequence of states within the modes are purely a matter of choice and routine programming of the microcomputer chip.

Figure 10:
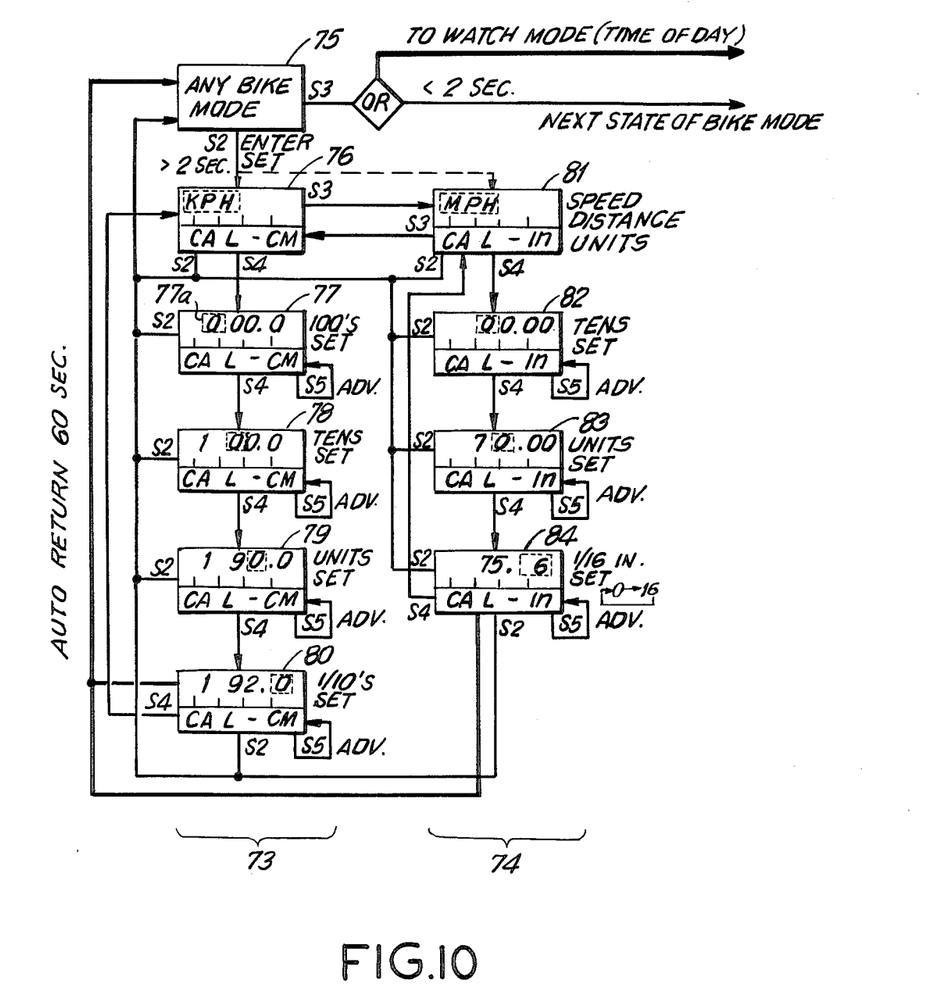
FIG. 10 is a state diagram of the speed/distance calibration mode for the circuit of FIG. 7.

Reference to FIG. 10 of the drawing illustrates another state diagram for a "calibration mode," which is used to enter an arithmetic constant into the computer. The value of the constant is dependent upon the particular bicycle wheel size, so that the signal from sensor 7 can be utilized by the computer to properly compute speed and distance traveled. Furthermore, the calibration mode provides for calibration either in English or metric units.

As shown in FIG. 10, the calibration mode comprises a metric calibration sequence set indicated by bracket 73 and an English calibration sequence set indicated by bracket 74. The calibration mode is entered from any of the bike mode states 70–72 (see FIG. 9) indicated generally by the rectangle 75. Pressing actuator S2 for more than 2 seconds causes the metric calibration set 73 to be entered as represented by display state 76. Successive depressions of actuator S4 causes repetitive metric calibration display states 77, 78, 79, 80, 76 and so forth. A flashing numeral, indicated symbolically for example by enclosing the numeral with dotted rectangle 77a in state 77 indicates which numeral may be advanced and set. Successive actuation of actuator S5 advances numeral 77a. The numeral which may be set is similarly symbolically shown in the other state displays. When the instrument is in the first metric display state 76, depression of actuator S3 will cause the calibration mode to shift to English calibration sequence set 74 and to display successively the display states 81, 82, 83, 84, 81.

Shifting back and forth between English and metric calibration modes takes place when the display is either in state 76 or in state 81 by actuation of switch S3. The metric calibration set is indicated by the flashing letters KPH (Kilometers Per Hour) when the instrument is in state 76 and the English system is indicated by the flashing letters MPH (Miles Per Hour) when the instrument is in state 81.

An important feature of the present invention is that the size of the constant introduced automatically causes a decision by the computer logic as to whether the constant represents circumference or radius of the bicycle wheel. For example, when in the metric calibration sequence set 73 (units in centimeters), an entry of greater than 76 centimeters means that the constant represents circumference of the bicycle wheel in centimeters, whereas entry of a number less than 76 centimeters means that the entry is the radius of the bicycle wheel in centimeters.

Escape from the calibration mode may take place in two ways. Either depression of actuator S2, or a time delay without changing state for more than 60 seconds, will cause the computer to exit the calibration mode and return to bike mode state 75, as indicated in FIG. 10.

OPERATION

Operation of the invention should be apparent from the following description. When not bicycling, watch 14 is worn as a normal digital wristwatch on the wrist using the strap attachments shown in FIGS. 2 and 3. It may be operated in watch mode 64 to provide normal timekeeping, timed delay, alarm or chronograph. Since there are no external signals, it will not be operated in the bike mode.

When utilizing the watch as a bicycle computer, it is removed from the wrist and inserted into the receptacle of holder 13 by lifting the pivotable member 31, inserting the case 15 and then closing the pivotable cover. The watch is further secured to holder 13 by attaching the strap halves around the housing parts 26, 27 and utilizing the normal wrist attachment to secure the wristwatch in place. When so mounted, the first external electrical terminals on the case make electrical contact with the second electrical terminals in the holder, these being electrically connected to sensors 7, 9 via cable 17.

Data obtained for calibration is obtained by measuring the radius of wheel 3 with the rider seated on bicycle 1, or by making a mark on the tire and determining the circumference by one or more revolutions of the wheel, again preferably with the rider mounted.

The calibration mode is entered by pressing actuator S2 (FIG. 10). The decision between English or metric units by depressing switch S3 is made. Then the radius (or circumference) is entered by successively pressing actuator S4 to determine the numeral to be set and setting it by successively pressing actuator S5. Side mounted actuators S1, S2, and S3 can be operated through the openings provided in the holder 13. The top mounted actuators S4, S5 are not affected by the holder.

While cycling, the readings of speed, pedaling cadence, or distance covered may be displayed by successive actuation of switch S3.

While there has been described what is considered to be the preferred embodiment of the invention other modifications will occur to those skilled in the art, and it is desired to secure in the appended claims all such modifications as fall within the true spirit and scope of the invention.

I claim:

1. A combination timepiece and bicycle computer for monitoring the operation of a bicycle, comprising:
    a case having an electrooptical display and a timekeeping circuit disposed therein, said circuit being also responsive to external signals, said case having a plurality of first electrical terminals connected to said circuit,
    a holder arranged for attachment to said bicycle, said holder having a plurality of second electrical terminals,
    at least one sensor disposed on said bicycle for providing a periodic signal,
    means connecting said sensor to selected second electrical terminals, and
    case retaining means in said holder defining a receptacle for temporarily holding said case so that said first electrical terminals are in contact with said second electrical terminals.

2. The combination according to claim 1, and including a strap attached to said case for holding it on the wrist when worn as a watch, said holder being arranged to receive said strap for further securing said case when it is in said receptacle.

3. The combination according to claim 1, wherein two sensors are disposed on said bicycle and are arranged to provide a periodic signal proportional to bicycle speed and a periodic signal proportional to pedaling cadence.

4. The combination according to claim 1, wherein said first electrical terminals include at least one socket terminal in the side of said case.

5. The combination according to claim 1, wherein said case includes at least one manual actuator, and wherein said holder retaining means defines a first window surrounding said manual actuator to provide access to the manual actuator when the case is in the receptacle.

6. The combination according to claim 1 wherein said case retaining means comprises a pivotable member attached to said holder and defining a second window for viewing the electrooptical display when the case is in the receptacle.

7. The combination according to claim 6, wherein said case includes a plurality of manual actuators on the sides thereof, and wherein said pivotable member defines a plurality of windows providing access to said manual actuators when the case is in the receptacle.

8. The combination according to claim 1, wherein said first electrical terminals comprise at least two socket terminals in the side of said case and wherein said second electrical terminals comprise at least two pins protruding into said receptacle.

9. The combination according to claim 8, wherein a said first electrical terminal additionally comprises a metal caseback attached to said case and wherein a said second electrical terminal further comprises a metal contact spring in the bottom of said receptacle.

10. The combination according to claim 1, wherein said holder includes first and second pivotably connected housing parts adapted to surround a handlebar, and having means to attach said housing parts to grasp the handlebar.

* * * * *